United States Patent
Rosenhouse et al.

(10) Patent No.: US 7,804,761 B2
(45) Date of Patent: Sep. 28, 2010

(54) MULTIPLEXING SEPARATELY MODULATED CHANNELS

(75) Inventors: Isaac Rosenhouse, Kiryat-Ono (IL); Haggai Mizrahi, Petach-Tikva (IL)

(73) Assignee: Ceragon Networks Ltd., Tel-Aviv (IL)

( * ) Notice: Subject to any disclaimer, the term of this patent is extended or adjusted under 35 U.S.C. 154(b) by 478 days.

(21) Appl. No.: 11/797,998

(22) Filed: May 9, 2007

(65) Prior Publication Data
US 2008/0279089 A1 Nov. 13, 2008

(51) Int. Cl.
*H04J 9/00* (2006.01)
(52) U.S. Cl. .................. 370/204; 370/533; 370/538
(58) Field of Classification Search .......... 370/203, 370/204, 532–545, 916
See application file for complete search history.

(56) References Cited

U.S. PATENT DOCUMENTS

| | | | |
|---|---|---|---|
| 5,781,076 A * | 7/1998 | Iwamatsu et al. ........... 332/103 |
| 6,621,366 B1 * | 9/2003 | Gentile ...................... 332/103 |
| 2001/0030785 A1 * | 10/2001 | Pangrac et al. .............. 359/125 |
| 2002/0012334 A1 * | 1/2002 | Strawczynski et al. ...... 370/337 |
| 2002/0172231 A1 * | 11/2002 | Claxton et al. .............. 370/537 |
| 2005/0025253 A1 * | 2/2005 | Sakoda ....................... 375/260 |
| 2005/0099939 A1 * | 5/2005 | Huh et al. ................... 370/210 |
| 2005/0149180 A1 * | 7/2005 | Mathis et al. .............. 623/2.11 |
| 2006/0136975 A1 * | 6/2006 | Murakami et al. .......... 725/117 |
| 2007/0092018 A1 * | 4/2007 | Fonseka et al. ............. 375/265 |
| 2008/0030265 A1 * | 2/2008 | Ido et al. .................... 329/317 |
| 2008/0095282 A1 * | 4/2008 | Walton et al. ............... 375/347 |
| 2008/0198695 A1 * | 8/2008 | Abdi ........................... 367/134 |

* cited by examiner

Primary Examiner—William Trost, IV
Assistant Examiner—Roberta A Shand

(57) ABSTRACT

A method of data transmission which includes providing a plurality of data streams, having different content, modulating the different data streams by respective modulators, multiplexing the modulated data streams into a single data stream alternately in time, such that the resultant stream includes at any specific time signals from fewer than all the data streams and transmitting the multiplexed single data stream onto a transmission channel.

31 Claims, 6 Drawing Sheets

MULTIPLEXING SEPARATELY MODULATED CHANNELS

FIELD OF THE INVENTION

The present invention relates to communications and particularly to methods of modulation.

BACKGROUND OF THE INVENTION

Amounts of data and rates of data transmitted in communication networks are continuously increasing. Many transmission channels do not carry digital signals efficiently, such as DSL channels and wireless channels. Signals transmitted on these channels are generally modulated onto an analog carrier signal, using one of various modulation schemes, such as QAM, QPSK and OFDM.

In OFDM, the data to be transmitted is modulated onto a plurality of carriers by a single modulator which generates a plurality of orthogonal multicarrier signals, which are on closely separated and hence partially overlapping frequency bands. The multicarrier signals are generated without frequency gaps between them, but the signals include a cyclic prefix and pilot tones which reduce the bandwidth efficiency.

US patent publication 2001/0030785 to Pangrac et al., published Oct. 18, 2001, the disclosure of which is incorporated herein by reference, describes the use of a plurality of separate modulators whose signals are separately converted into analog signals and up-converted onto separate frequency channels which are then combined into a single signal for transmission. In order to avoid interference between the channels, there are frequency gaps between the channels, which reduce the amount of data which can be transmitted on an assigned bandwidth. It would be desired to increase the amount of data transmitted on the channel.

The use of the entire bandwidth as a single channel with a single modulator, in order to avoid the waste of requiring frequency gaps, would require a very high rate of modulation operation and hence very complex and costly hardware, and may not be at all possible for very high transmission rates.

U.S. Pat. No. 6,621,366 to Gentile, dated Sep. 16, 2003, the disclosure of which is incorporated herein by reference, describes the generation of a high rate modulated signal at a relatively high frequency, from a large number of samples. Rather than generating all the samples by a single high speed modulator, the samples are generated by a plurality of lower rate modulators operating on the same data, and the samples are then multiplexed together. While the description of Gentile may reduce the operation rate of the modulators, it does not increase the data rate transmitted on the channel, as all the modulators operate on the same data.

SUMMARY OF THE INVENTION

An aspect of some embodiments of the present invention relates to a method of modulating data for transmission on a single channel, in which a plurality of modulators operating on separate input digital data streams provide modulated digital data sequences. The modulated data sequences are multiplexed together by alternately inserting into a combined digital stream, blocks from the different modulated data sequences. The combined digital stream is then converted into an analog signal for transmission on the single channel. By handling the input data by a plurality of modulators, the rate at which the modulators are required to operate is reduced.

In some embodiments of the invention, a single input data stream is divided into the plurality of separate input data streams for modulation. Alternatively, the different input data streams are received from different sources.

Optionally, the transition between blocks from different modulated sequences in the combined stream is performed at times at which the two sequences involved in the transition (i.e., the sequence of the block until the transition and the sequence of the block after the transition) allow a smooth transition. Optionally, the transition is performed after the two sequences were identical for a sufficient number of symbols and/or when the sequences are otherwise considered similar for the purpose of performing a transition. In some embodiments of the invention, the transition is performed after the two sequences were identical for at least the length of a filter used in the modulation. Alternatively, the transition is performed after the two sequences were identical for at least an effective length of the filter, i.e., a length in which most of the power of the filter is concentrated, for example more than 80%, 90% or even more than 95% of the power.

In some embodiments of the invention, the transition is performed when both sequences involved in the transition carry the same or substantially the same pattern for a predetermined number (e.g., 10, 20) of symbols.

However, in some situations such similar or identical sequences do not occur naturally. In some embodiments of the invention, a separation sequence is added into the input data streams between each pair of blocks, and the transitions are performed during the separation sequence, such that the sequences involved in the transition allow a smooth transition. In addition to preventing spikes in the transmitted signal due to the transitions and hence reducing sidelobes in its spectral density, the separation sequence optionally provides the transmitted stream with known sequences, which may be used at a receiver for synchronization with the transmitter and/or for channel estimation.

The signals transmitted on the single channel may be mounted on a single carrier frequency or on a plurality of close carrier frequencies whose transmissions would normally interfere with each other if transmitted at the same time.

An aspect of some embodiments of the present invention relates to a method of independently modulating a plurality of separate data streams and transmitting them on a single channel without reserving an unused frequency gap between separate streams. Optionally, the separate data streams are multiplexed in their modulated base band digital form before being up-converted for transmission. Alternatively, the separate data streams are upconverted to their carrier frequencies of the same channel before being multiplexed. A smoothing sequence is optionally placed at transition points between blocks from different streams in the multiplexed stream. In some embodiments of the invention, the smoothing sequence forms less than 10%, less than 6% or even less than 2% of the transmitted data, thus achieving a substantially higher utilization rate of the channel relative to using a frequency gap between separate channels used for the transmission, which generally occupies more than 10% or even more than 12% of the frequency band. Therefore a higher data transmission rate may be achieved using some embodiments of the present invention.

There is therefore provided in accordance with an exemplary embodiment of the invention, a method of data transmission, comprising providing a plurality of data streams, having different content, modulating the different data streams by respective modulators, multiplexing the modulated data streams into a single data stream alternately in time, such that the resultant stream includes at any specific time signals from fewer than all the data streams; and transmitting the multiplexed single data stream onto a transmission channel.

Optionally, providing the plurality of data streams comprises splitting data from a single file into a plurality of data streams. In some embodiments of the invention, providing the plurality of data streams comprises providing at least three data streams.

Optionally, modulating the data streams comprises modulating at a rate equal to the rate of the multiplexing divided by the number of data streams. Optionally, the multiplexing is performed such that switches between two data streams in the multiplexed single data stream occur when respective filters of multiplexers of the data streams have a substantially same state. Alternatively or additionally, the multiplexing is performed such that switches between two data streams have the same values over a sequence including at least 80% of an effective length of filters of the modulators.

Optionally, the method includes adding one or more predetermined separation sequences to the data streams before the multiplexing, such that the data streams have the same values when the switches occur. Optionally, the separation sequences include at least 10 symbols. Optionally, the method includes dividing the data streams into blocks and adding a predetermined separation sequence between the blocks, before modulating the streams. Optionally, multiplexing the modulated data streams comprises multiplexing such that the resultant stream comprises blocks provided cyclically from each of the modulated data streams. Optionally, adding a predetermined separation sequence between the blocks comprises adding different separation sequences between different blocks.

Optionally, multiplexing the modulated data streams comprises multiplexing the modulated data streams such that the resultant data stream includes at any specific time only signals from one of the streams. Optionally, modulating the data streams comprises modulating by modulators that operate independently from each other. Optionally, modulating the different data streams comprises modulating by modulators receiving a same timing signal.

Optionally, modulating the data streams comprises modulating by a plurality of modulators that operate in accordance with a same modulation method. Optionally, modulating the data streams comprises modulating by a plurality of modulators including at least two modulators that operate according to different modulation methods.

Optionally, modulating the data streams comprises modulating into a plurality of streams at a same power level. Alternatively, modulating the data streams comprises modulating into a plurality of streams having different power levels. Optionally, modulating the data streams comprises modulating by a plurality of modulators that operate at different bit rates. Optionally, the method includes upconverting the modulated data streams before the multiplexing. Alternatively, the upconverting is performed after the multiplexing. Possibly, upconverting the modulated data streams comprises upconverting after converting into analog signals. Optionally, the method includes transmitting the single data stream on an analog carrier. Optionally, multiplexing the modulated data streams comprises multiplexing while the data streams are in a digital form. Alternatively, the multiplexing is performed while the data streams are in an analog form. Optionally, modulating the different data streams comprises modulating by modulators included in a single transmitter.

Optionally, modulating the data streams comprises modulating using a QAM or PSK modulation. Alternatively or additionally, the modulating uses an OFDM or CPM modulation.

There is further provided in accordance with an exemplary embodiment of the invention, a modulator system, comprising a plurality of modulators, a plurality of respective selectors for each of the modulators, adapted to alternately provide the modulators with a block from an input stream or a predetermined separation sequence and a multiplexer adapted to combine modulated data streams from the modulators into a single data stream which includes at any specific time only signals from one of the modulators.

Optionally, the plurality of modulators operate independently of each other.

There is further provided in accordance with an exemplary embodiment of the invention, a method of data demodulation, comprising receiving, by a receiver, a data stream from a single communication channel, demultiplexing the received data stream into a plurality of sub-streams, by the receiver, using a time division and demodulating, by the receiver, each of the sub-streams independently by respective separate demodulators.

Optionally, demultiplexing the received data stream comprises identifying a predetermined separation sequence in the stream and not including the occurrences of the sequence in any of the sub-streams. Optionally, the method includes receiving the data stream by a plurality of receivers and wherein a first one of the receivers demodulates all of the sub-streams and a second one of the receivers demodulates fewer than all the sub-streams.

There is further provided in accordance with an exemplary embodiment of the invention, a method of data modulation, comprising modulating a plurality of data streams, having different content, independently of each other, upconverting the modulated data streams into a frequency band without frequency gaps within the band and transmitting the upconverted modulated data stream on a transmission medium.

Optionally, transmitting the upconverted modulated data stream comprises transmitting on a wireless medium. Optionally, the method includes multiplexing the modulated data streams before the upconversion.

BRIEF DESCRIPTION OF THE DRAWINGS

Exemplary non-limiting embodiments of the invention will be described with reference to the following description of the embodiments, in conjunction with the figures. Identical structures, elements or parts which appear in more than one figure are preferably labeled with a same or similar number in all the figures in which they appear, and in which.

DETAILED DESCRIPTION OF EXEMPLARY EMBODIMENTS

Transmitter

Figure 1:
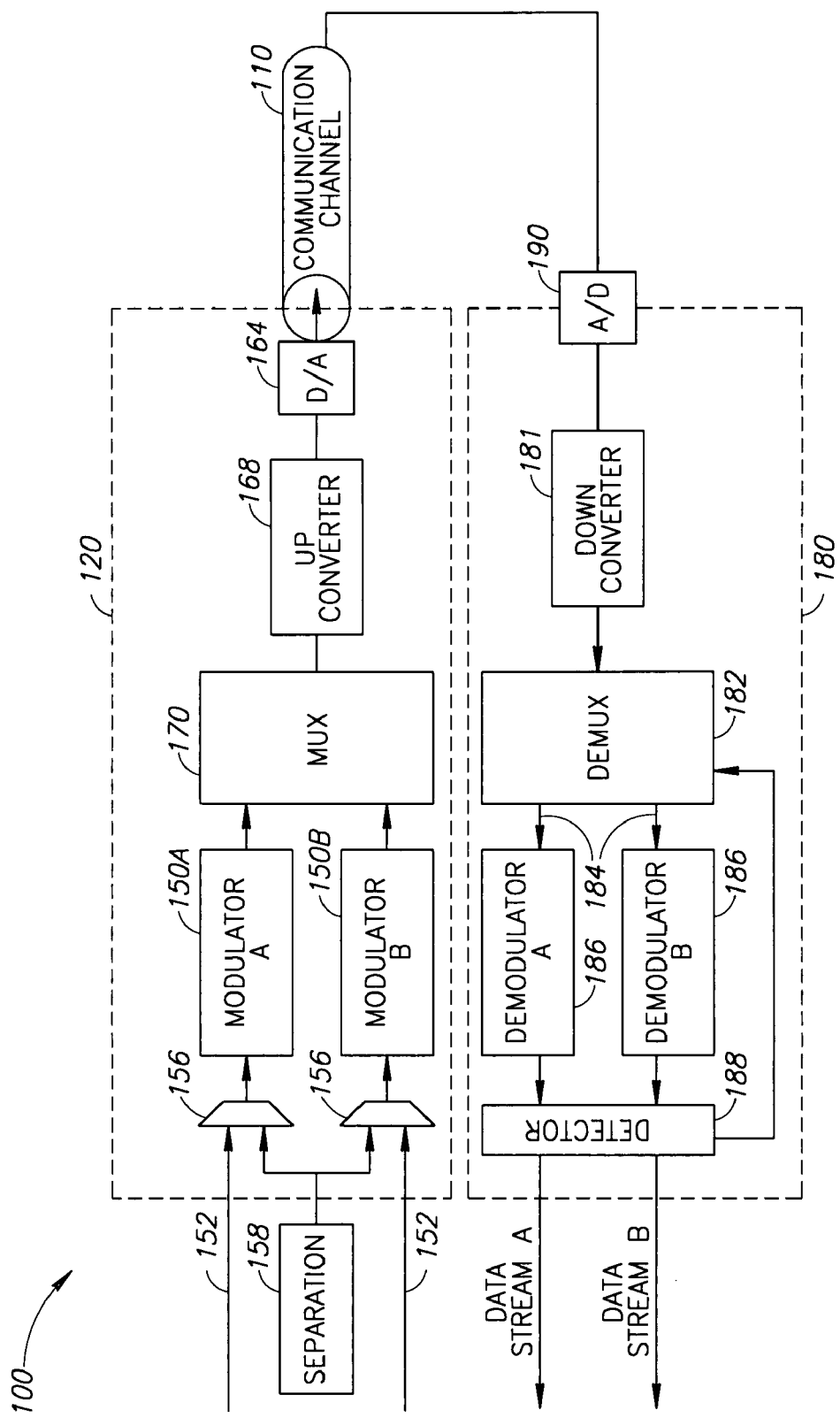
FIG. 1 is a block diagram of a communication system, in accordance with an exemplary embodiment of the present invention.

FIG. 1 is a block diagram of a communication system 100, in accordance with an exemplary embodiment of the present invention. A transmitter 120 comprises a plurality of modulators 150, marked 150A and 150B, which receive input data streams from respective data lines 152 and provide respective modulated digital streams to a multiplexer 170. An up-converter 168 up converts the multiplexed digital signals, which are then provided to a digital to analog (D/A) converter 164 which converts the signals into analog signals. The analog signals are transmitted through a communication channel 110 to a receiver 180.

Figure 6:
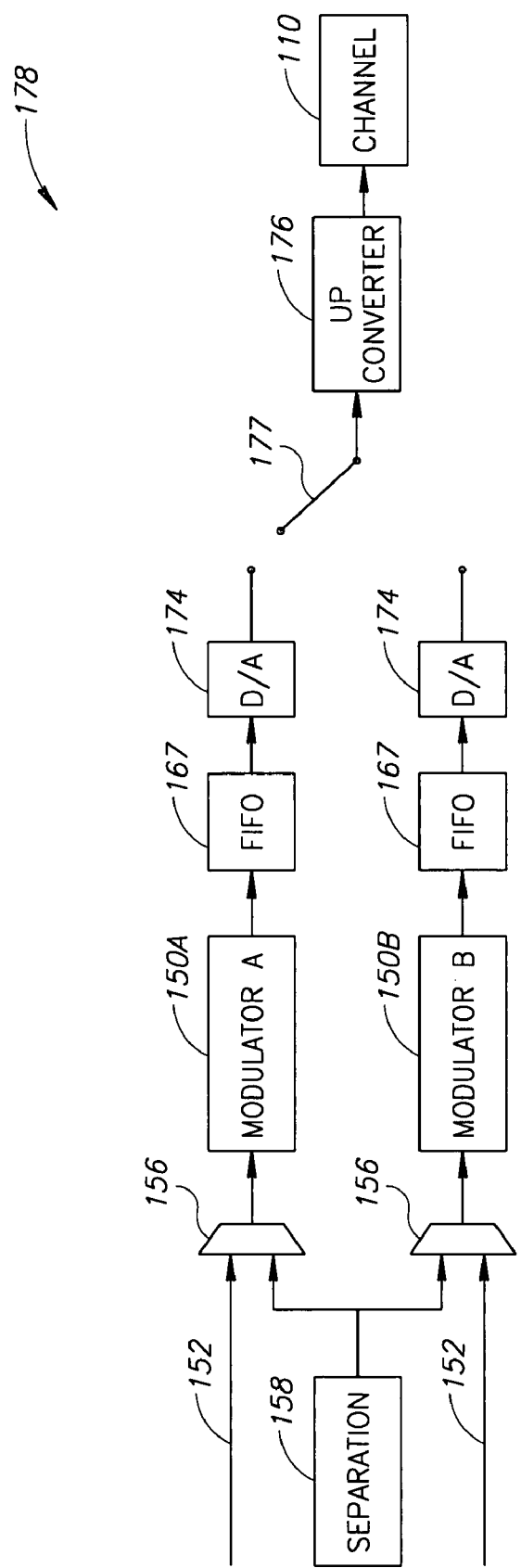
FIG. 6 is a schematic block diagram of a transmitter, in accordance with another exemplary embodiment of the invention.

Alternatively to up-converting the digital signals, the up-conversion is performed on the analog signals, the analog up-converter being located after D/A 164, for example as illustrated in FIG. 6. Further alternatively, the up-conversion is performed by modulators 150 before multiplexer 170, as discussed below with reference to FIG. 4.

The data of the input streams may belong to a single data file which is distributed between modulators 150 according to any suitable scheme, or the data of the different input streams may belong to different data sources.

Optionally, the input data streams are provided through selectors 156, which, e.g., periodically, provide a separation sequence from a register 158, to separate between data blocks of the modulated streams. Selectors 156 optionally provide the separation sequence to all of modulators 150 in parallel such that modulators 150 receive the separation sequence at the same time.

While only two input data streams and respective modulators 150 are shown, substantially any number of input data streams and modulators may be used, possibly more than three, more than seven or even more than fifteen. In an exemplary embodiment of the invention, 32 modulators 150 are used in parallel. In another exemplary embodiment of the invention, 4 modulators 150 are used in parallel. It is noted that in some embodiments it is convenient that the number of modulators is a power of 2.

Optionally, all of modulators 150 operate at the same rate. Multiplexer 170 optionally operates at a speed n times (n being the number of modulators 150) faster than the speed of modulators 150, such that the data generated by all of modulators 150 is handled by multiplexer 170. Thus, in accordance with some embodiments of the invention, modulators 150 are allowed to operate at a relatively low rate and only multiplexer 170, up converter 168 and D/A converter 164 in transmitter 120, are required to operate at a high speed. In other embodiments of the invention, different modulators 150 operate at different rates and multiplexer 170 operates at a rate which is suitable to operate with the data produced by the modulators 150. Alternatively or additionally, as described below with reference to FIG. 6, an analog switch is used instead of multiplexer 170.

Each of modulators 150 optionally operates at a rate of at least 50 kHz or even at least 100 kHz or at least 500 kHz. In some embodiments of the invention, each of modulators 150 operates at a rate of at least 10 MHz, and the total rate of modulators 150 is above 60 MHz. In an exemplary embodiment of the invention, two modulators 150, each operating at about 40 MHz are used, to achieve a rate of about 80 MHz.

Receiver

In receiver 180 (also shown in FIG. 1), the received signals are sampled by an analog to digital converter (A/D) 190 and then down-converted by a down-converter 181. The sampling may be performed, for example, in an intermediate frequency or in a baseband frequency and/or using any method known in the art. A/D converter 190 optionally separately samples the I and Q phases of the received signal, as is known in the art, or two separate samplers are employed. Alternatively, down-scaling of the transmitted signal may be performed through an intermediate frequency using methods known in the art.

The sampled signals are optionally demultiplexed by a demultiplexer 182 into a plurality of streams 184 corresponding to respective modulators 150. Each stream 184 is provided to a respective demodulator 186. A separation sequence detector 188 optionally detects the separation sequences from the demodulated sequences and controls the timing of demultiplexer 182, based on the timing of the separation sequences in the received stream. Alternatively or additionally, separate in-band or out-of-band timing signals may be used to synchronize the receiver to the transmitter. Optionally, detector 188 also removes the separation sequences from the demodulated streams. Demodulators 186 optionally update their symbol timing, carrier phase and/or equalizer response, based on the received form of the separation sequence.

Multiplexer 170 and demultiplexer 182 optionally include sufficiently large buffers to store the data they handle until it is multiplexed or demultiplexed. Alternatively to the buffers being included in a single unit with multiplexer 170 and demultiplexer 182, separate buffers or other memory units may be placed between modulators 150 and multiplexer 170 and/or between demultiplexer 182 and demodulators 186. The buffers can be of any suitable memory type.

In an exemplary embodiment of the invention, the modulators 150 include symbol mappers, shaping filters and up-converters, as is known in the art. Optionally, in these embodiments, each demodulator 186 comprises a down converter, a matched filter, a symbol timing corrector, an equalizer, a phase corrector, a slicer and a demapper, as is known in the art.

Separation Sequence

Figure 2:
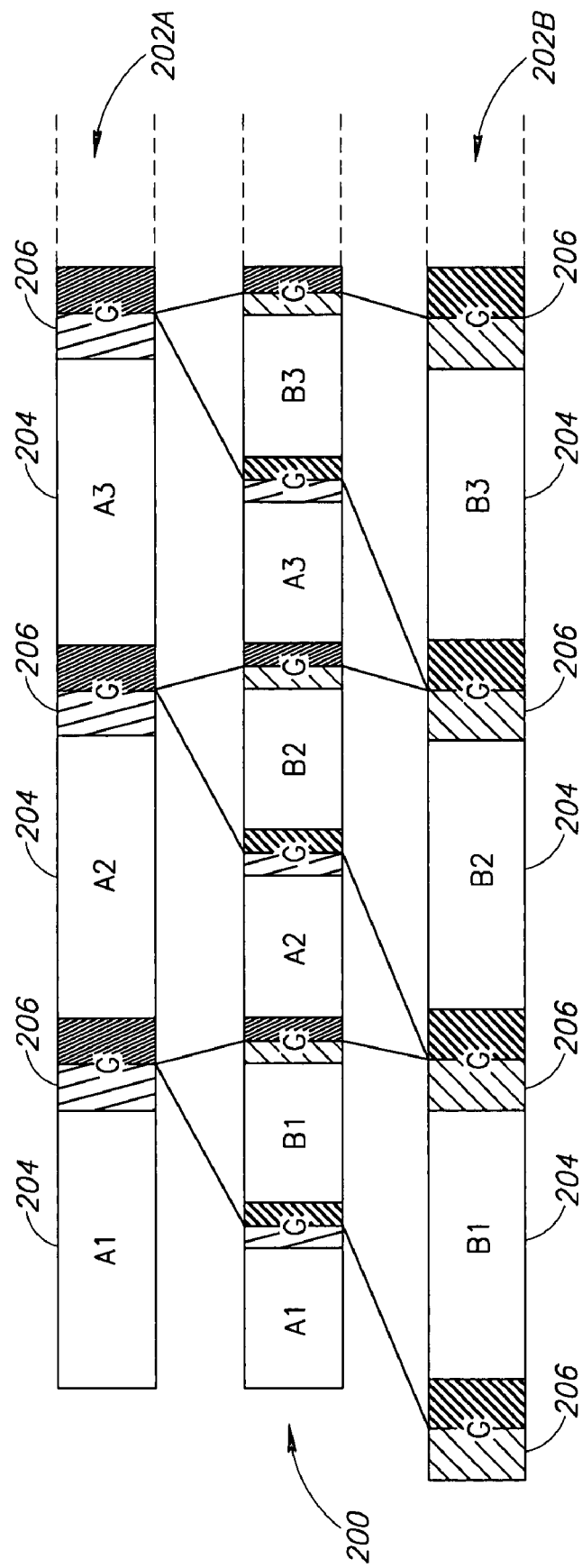
FIG. 2 is a schematic illustration of streams generated and multiplexed in accordance with an exemplary embodiment of the invention.

FIG. 2 is a schematic illustration of the streams 202A and 202B generated by modulators 150A and 150B, respectively, and a resultant multiplexed stream 200, in accordance with an exemplary embodiment of the invention. Streams 202A and 202B are formed of data blocks 204, separated by a separation sequence 206. The multiplexed stream 200 includes blocks from streams 202A and 202B alternately. The blocks of streams 202A and 202B are shorter in stream 200, to illustrate that stream 200 is generated at a faster data rate.

In FIG. 2, different portions of the separation sequences 206 are marked differently, to indicate the stream 202 from which they are received. These markings do not relate to the content of the separation sequences 206, which may be identical in the embodiment of FIG. 2.

Optionally, the transition between stream 202A and 202B in multiplexed stream 200 is carried out after a sufficient number of symbols of separation sequence 206 have passed, so that the modulator filters will be at the same states, or effectively same states, during the switch and side lobes are not caused due to the transition. In some embodiments of the invention, the transition is not performed too close to the end of the sequence, such that even if there is a slight inaccuracy in the timing in the transmitter or the receiver, the transition will still occur within the separation sequence 206 and will not cause data loss. Optionally, the transition is in the middle of separation sequence 206.

In some embodiments of the invention, blocks 204 are all of the same length. Alternatively, the lengths of blocks 204 vary over time, according to a compromise between delay and throughput. Longer blocks are optionally used for data requiring high throughput, while shorter blocks are optionally used for data requiring low delay. Optionally, in this alternative, the blocks of streams 202A and 202B generated at the same time, are of substantially the same length. Alternatively, modulators 150 operate with same symbol rates but at different data rates, using different symbol modulations, and accordingly, the blocks of streams 202A and 202B are of different sizes. For example, one modulator 150 may use QAM modulation, while another modulator 150 uses QPSK modulation. In another exemplary embodiment of the invention, in accordance with this alternative, one or more of modulators 150 operate according to a 16 QAM modulation, while one or more other modulators 150 operate with a 256 QAM modulation, all the modulators 150 operating at a symbol rate of 25 MSymbols/Sec. The separation sequence is optionally generated in a manner which is compatible with all the modulations used, for example using a 16 QAM modulation which is compatible also with a 256 QAM modulation.

Blocks 204 may be of substantially any desired length, for example between about 1000-10,000 bits. Optionally, separation sequences 206 comprise less than 2%, less than 1% or even less than 0.5% of the signals transmitted on channel 110, in order to maximize the portion of the bandwidth used for data. Alternatively, for example when a low delay is required and hence blocks 204 are short, separation sequences may form more than 3%, more than 5% or even more than 8% of the signals transmitted on channel 110. In comparison, for transmission using QAM modulation on a frequency band of 50 MHz, a band of at least 56 MHz, adding 12%, is generally used for separation from other frequency bands.

Optionally, when modulators 150 comprise QAM modulators, separation sequences 206 are at least the length of the shaping filters of the modulators, so that the transition between streams 202 does not involve changing of the shaping filter, which may cause side lobes in the transmitted signals. In some embodiments of the invention, separation sequence 106 is longer than the length of the shaping filters of the modulators, for example in order to allow detector 188 a higher chance of detecting the sequence 106 and/or to allow receiver 180 easier synchronization onto the sequence. In an exemplary embodiment of the invention, separation sequence 206 is of a length of between about 10-25 symbols, or between about 20-100 bits, although sequences longer than 100 bits or even longer than 200 bits may also be used, for example when communication channel 110 has relatively harsh conditions and/or when high bit rate symbols are used.

Separation sequence 206 optionally has a high autocorrelation level with a relatively large peak in its center and relatively low values at its sides, to allow easy detection in the receiver. In some embodiments of the invention, separation sequence 206 has an average symbol value close to, or even equal to the median of the possible symbol values of the sequence. For example, for a binary sequence, separation sequence 206 optionally has an average bit value between 0.3 and 0.7, optionally between 0.45 and 0.55. Alternatively, for simplicity of generation of the separation sequence, a zero sequence is used, although making it possibly more difficult to identify the separation sequence. In accordance with this alternative, a relatively long sequence may be used which substantially cancels the history of modulator 150 before the switch is performed.

In some embodiments of the invention, the same separation sequence 206 is used throughout the entire resultant multiplexed stream 200. Alternatively, for example when more than two modulators 150 are used, a plurality of different separation sequences are used, as is now illustrated with reference to FIG. 3. The different sequences are used in the streams 202 in a manner such that the same separation sequence is used in both streams involved in a switch between streams 202. While a single separation sequence may be used with substantially any number of streams 202, the use of a plurality of separation sequences may allow easier identification of the timing of the combined stream.

Figure 3:
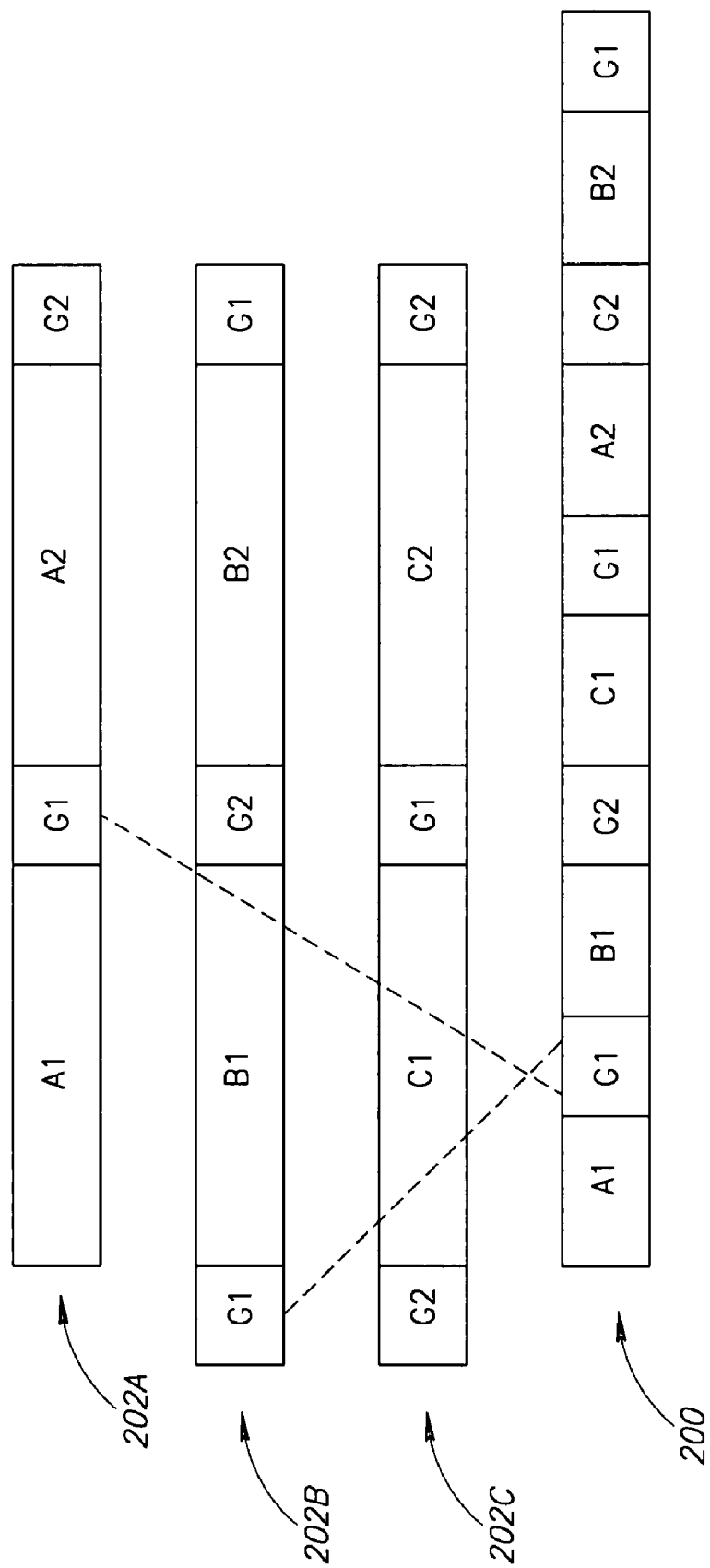
FIG. 3 is a schematic illustration of use of two different separation sequences, in accordance with an exemplary embodiment of the invention.

FIG. 3 is a schematic illustration of use of two separation sequences G1 and G2 in multiplexing three streams 202 (marked 202A, 202B and 202C), in accordance with an exemplary embodiment of the invention. Each of the streams 202 uses the sequences G1 and G2 in the alternative. In the combined stream 200 (shown out of scale), the separation sequences G1 and G2 are used alternately. In a similar manner, n−1 separation sequences may be used for any n sequences.

In some embodiments of the invention, the separation sequence is formed of a switching portion which is the same in both streams involved in the switch and an identification portion which is different for different streams and is used, for example, to identify the stream 202 from which the data before or after the separation sequence was received. The identification portion of the separation sequence may be used instead of or in addition to other in band or out of band measures used to identify the stream 202 to which each portion of the combined stream 200 belongs.

Data Order

In some embodiments of the invention, as described above, blocks are provided from modulators 150 to resultant multiplexed stream 200 in accordance with a predetermined order. The predetermined order may be a cyclical order, each modulator 150 providing a block after all the other modulators provided their blocks. Alternatively, one or more of the modulators 150 may provide blocks more often than other modulators, in accordance with the predetermined order. In some embodiments of the invention, however, the order of providing blocks is dynamically adjusted, for example according to the amount of data handled by each of the modulators. In accordance with some of these alternatives, it may be advantageous to use only a single separation sequence for all switches between streams 202.

Optionally, in-band or out of band signals are used to notify the receiver on the modulator generating each of the blocks. Alternatively, when different modulation methods are used by the different modulators, each demodulator attempts to demodulate each of the sequences, as each demodulator will only succeed to demodulate the signals of its demodulation.

Sequence Identification

In receiver 180, demultiplexer 182 splits the received signals into blocks of the length of a single block 204 and a single separation sequence 206 and provides the blocks 204 alternately to demodulators 186, after removing the separation sequence.

When initially beginning the reception of a new transmission, the splitting time for moving between providing the data to one demodulator and to the other is optionally selected randomly and/or based on an examination of the received signal. Optionally, demultiplexer 182 seeks a pattern having a high auto correlation with a modulated version of the separation sequence 206. In some embodiments of the invention, at least at the beginning of the transmission, the correlation is performed on the basis of magnitude only, in order to avoid phase mismatch. Optionally, after the phase timing is properly determined, the correlation is performed based on both magnitude and phase. In some embodiments of the invention, when receiver 180 has difficulties in identifying separation sequence 206, the incoming signals are split, in parallel, randomly or sequentially step by step, at a plurality of different points and for each splitting demodulators 186 attempt to demodulate the signals until the demodulation is successful.

Thereafter, detector 188 identifies separation sequences 206 in the received signals and adjusts the timing of demultiplexer 182.

Modulation Type

Modulators 150 and demodulators 186 may operate in accordance with any modulation method known in the art, including QAM (quadrature amplitude modulation) of various rates, e.g., QPSK, BPSK and 256 QAM, OFDM and CPM (continuous phase modulation). As mentioned above, different modulators 150 may use different modulation methods.

Figure 4:
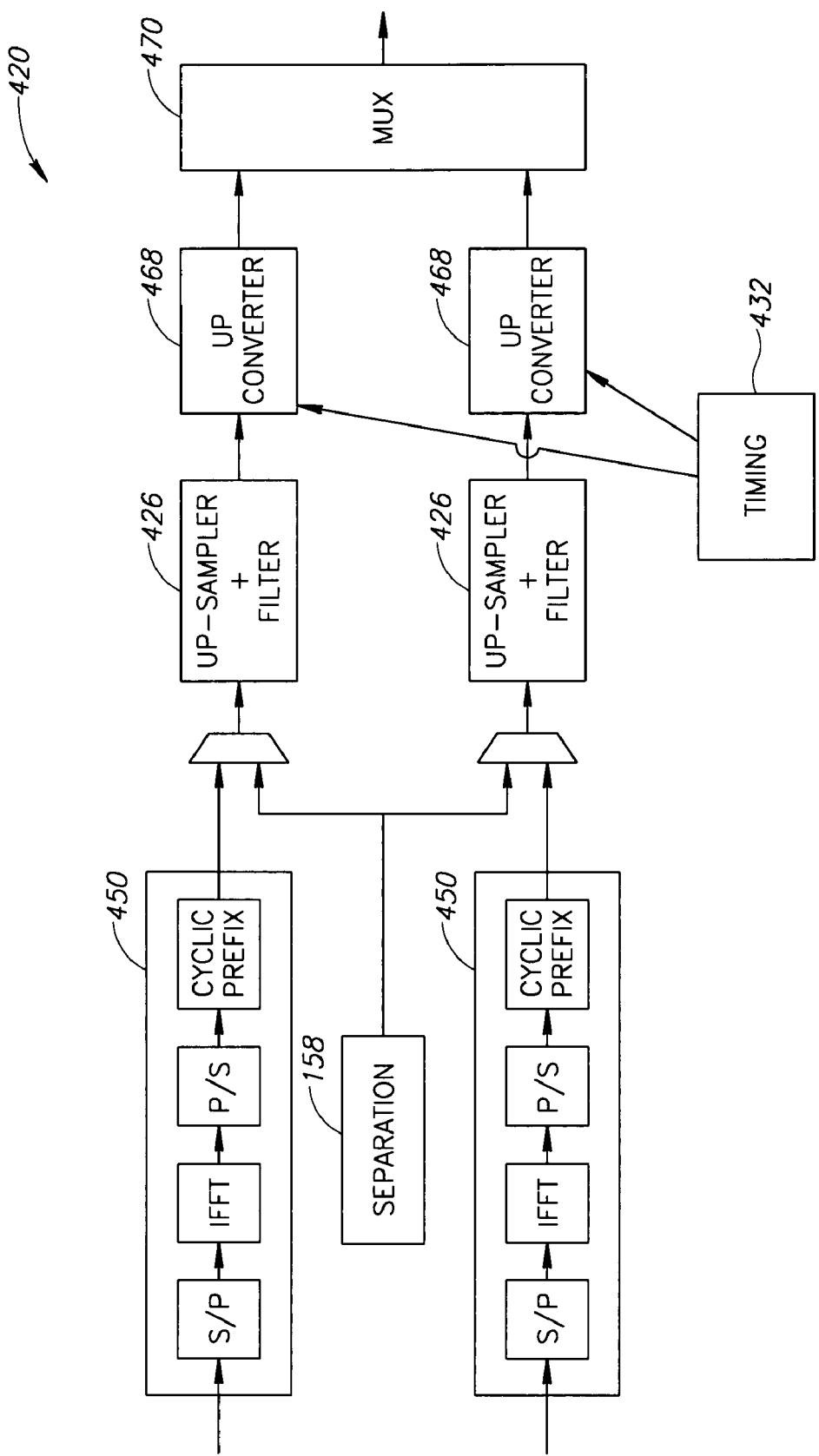
FIG. 4 is a schematic block diagram of an OFDM transmitter, in accordance with an exemplary embodiment of the invention.

FIG. 4 is a schematic block diagram of an OFDM transmitter 420, in accordance with an exemplary embodiment of the invention. Transmitter 420 comprises a plurality of OFDM modulators 450, corresponding to modulators 150 of FIG. 1. Separation sequence 206 is provided from a register 158 before a last filter 426 of the modulator. The modulated signals from filters 426 are passed through up converters 468 (corresponding to up converter 168 of FIG. 1) to a multiplexer 470 (corresponding to multiplexer 170 of FIG. 1), which combines the modulated streams together.

In FIG. 4, up converters 468 are located before multiplexer 470, although any of the up conversion options discussed above regarding FIG. 1 may be used in an OFDM transmitter. Optionally, up converters 468 all receive a timing signal from a same timing unit 432, so that the up-converted signals do not suffer from time mismatch. In some embodiments of the invention, up converters 468 receive a sin(x) signal, which they use in the up-conversion, from timing unit 432. Alternatively, up converters 468 receive periodic time triggers from timing unit 432 and the up converters generate the sin(x) signal they require based on the received triggers.

In some embodiments of the invention, for example when used for CPM or other modulation methods using an infinite history, separation sequence 206 depends on the data appearing before the separation sequence. Optionally, a first group of symbols of separation sequence 206 is data dependent and is used to bring the modulator to a known state and a second, subsequent, group of symbols is independent of the data so that it can be used by the receiver to identify the sequence. The first group of symbols optionally includes less than 40% or even less than 20% of the symbols of the separation sequence 206. The first group of symbols is optionally selected according to the current state of the modulator, in a manner which brings the modulator to a predetermined phase.

In removing the separation sequence at the demodulator, the second group of symbols is optionally identified and removed and, in addition, a predetermined number of symbols forming the first group of symbols of the separation sequence are removed.

Multi Receiver Embodiment

Figure 5:
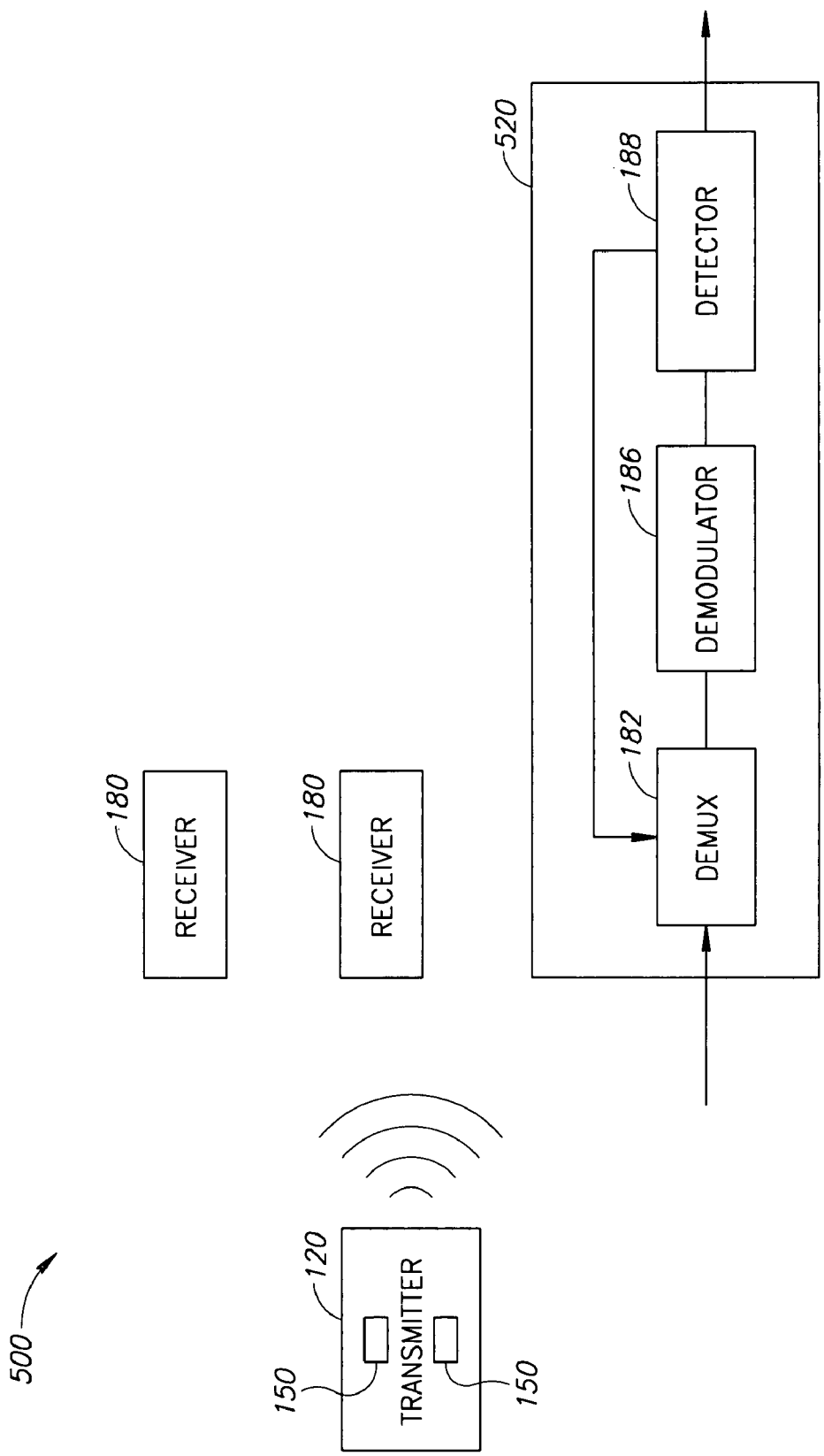
FIG. 5 is a schematic illustration of a transmission network, in accordance with an exemplary embodiment of the invention.

FIG. 5 is a schematic illustration of a transmission network 500, in accordance with an exemplary embodiment of the invention. Network 500 uses transmitter 120 for transmission to a plurality of receivers 180 and/or 520, possibly in different geographical locations. Optionally, at least two of the receivers are distanced from each other by more than 10 meters, more than 50 meters or even more than a kilometer.

In some embodiments of the invention, all the receivers 180 are adapted to demodulate the signals modulated by all of modulators 150. Alternatively, one or more of the receivers 180 is adapted to receive the signals of fewer than all the modulators 150. For example, for a transmitter 120 including four modulators, one or more of the receivers may be adapted to demodulate only signals from two or three of the modulators. In an exemplary embodiment of the invention, one or more of the receivers comprises a single demodulator receiver 520, which is adapted to demodulate signals only from a single modulator 150. Alternatively or additionally, one or more receivers include a fast demodulator which can operate fast enough to handle streams generated by a plurality of modulators. In other embodiments of the invention, each receiver receives signals modulated by a single one of the modulators.

In an exemplary embodiment of the invention, network 500 is used to deliver data of a plurality of levels of detail to receivers. Data of a basic level of detail is modulated by a first modulator for which all the receivers have a corresponding demodulator, while higher levels of data are modulated by one or more other modulators having corresponding demodulators in fewer than all the receivers.

The modulators 150 of transmitter 120 may all use the same modulation method. Alternatively, one or more of the modulators 150 uses a different modulation method than the other modulators. Possibly, when transmission network 500 is used for transmission of data of a plurality of levels, the basic level data is modulated using a relatively slow and/or simple modulation, which can be demodulated by inexpensive receivers. In an exemplary embodiment of the invention, a first receiver supports only the 8-PSK modulation and a second receiver supports the 64 QAM modulation and therefore can demodulate also signals of the 8-PSK modulation.

Alternatively or additionally to generating signals of different modulation, different modulators 150 generate signals of different power levels. In an exemplary embodiment of the invention, one or more of modulators 150 generates signals with a low power level directed to receivers that can decipher signals with a low signal to noise ratio (SNR), while one or more other modulators 150 generate signals at a higher power level, which can be deciphered also by receivers requiring a high SNR. Optionally, at least two separation sequences 206 are used in accordance with these alternatives, a first separation sequence which gradually increases the power level and a second sequence which gradually decreases the power level.

Alternatives

Alternatively to using separation sequence 206, resultant multiplexed stream 200 may be formed only from blocks 202, without separation sequence 206. This alternative is optionally used when there are no adjacent channels which may suffer from the interference (e.g., when the transmission passes on a dedicated transmission wire) and/or when other signals than separation sequence 206 are used for synchronization.

Further alternatively, rather than performing the transitions within separation sequence 206, the transitions are performed when the streams carry a same data pattern or a similar data pattern, which will not cause side lobes during a transition. Optionally, in accordance with this alternative, a preliminary unit of transmitter 120 identifies convenient points for transitions in the transmitted data and instructs multiplexer 170 accordingly. Indications of the transition points are transmitted to the receiver, out of band or in-band, in order to allow for demultiplexing.

FIG. 6 is a schematic block diagram of a transmitter 178, in accordance with an exemplary embodiment of the invention. Transmitter 178 is similar to transmitter 120 of FIG. 1, but differs in the use of an analog switch 177 instead of multiplexer 170, to combine the modulated streams. The analog switch is optionally a wideband RF component, which operates at the high rate of up-converter 176. Optionally, each D/A converter 174 operates at the high rate of switch 177, when switch 177 is connected to the D/A converter and stops its operation when switch 177 is connected to a different D/A converter 174. A first-in-first-out FIFO 167 memory unit is used to store the signals from modulator 150 for retrieval by D/A converter 174.

FIG. 6 also illustrates that the up conversion is performed by an analog up converter 176 located after switch 177. Alternatively, a plurality of analog up converters may be located after D/A converters 174, before switch 177, or digital up conversion may be used in accordance with any of the above described embodiments. It is further noted that the analog up conversion may be used in substantially any of the above described embodiments, such as the embodiment of FIG. 1.

The embodiment of FIG. 6 may be used, for example, when it is desired to use existing units of modulators 150 and D/A 174 to form a multi-modulator transmitter 178.

The above described methods may be used on substantially any analog transmission channel, including wire and wireless channels, such as DSL, cellular and satellite channels. The above methods may be used in point to point transmission channels as well as in point to multi-point transmission channels and multi-point to mutli-point transmission channels.

The modulator and demodulator may be implemented using any method known in the art including software, hardware and firmware (e.g., an FPGA). It is noted, however, that the relatively low operation rate of the modulators and demodulators allows easier implementation thereof in software.

In some embodiments of the invention, the signals from all of modulators 150 are up-converted onto a same carrier frequency. Alternatively, signals from different modulators 150 are up-converted onto different carrier frequencies included in a single channel, i.e., whose signals would interfere with each other if transmitted at the same time. In accordance with this alternative, the carrier frequencies are selected such that at the point of switching in the smoothing sequence, there is no phase shift due to the switching.

It will be appreciated that the above-described apparatus and methods may be varied in many ways, while still implementing the ideas of some embodiments of the present invention. For example, while the above description relates to a transmitter with two modulators, other embodiments of the invention may include more modulators, even more than five or ten modulators. It should also be appreciated that the above described description of methods and apparatus are to be interpreted as including apparatus for carrying out the methods, and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to".

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of multiplexing and transmitting data, comprising:
providing a multiplexer with a plurality of data streams, having different content;
modulating the different data streams by respective modulators;
multiplexing the modulated data streams into a single data stream alternately in time, such that:
the resultant stream includes at any specific time signals from fewer than all the data streams; and
switches between two data streams in the multiplexed single data stream occur when respective filters of multiplexers of the two data streams have a substantially same state; and
transmitting the multiplexed single data stream onto a transmission channel.

2. A method according to claim 1, wherein providing the plurality of data streams comprises splitting data from a single file into a plurality of data streams.

3. A method according to claim 1, wherein providing the plurality of data streams comprises providing at least three data streams.

4. A method according to claim 1, wherein modulating the data streams comprises modulating at a rate equal to the rate of the multiplexing divided by the number of data streams.

5. A method according to claim 1, wherein the multiplexing is performed such that switches between two data streams have the same values over a sequence including at least 80% of an effective length of filters of the modulators.

6. A method according to claim 1, comprising adding one or more predetermined separation sequences to the data streams before the multiplexing, such that the data streams have the same values when the switches occur.

7. A method according to claim 6, wherein the separation sequences include at least 10 symbols.

8. A method according to claim 1, comprising dividing the data streams into blocks and adding a predetermined separation sequence between the blocks, before modulating the streams.

9. A method according to claim 8, wherein multiplexing the modulated data streams comprises multiplexing such that the resultant stream comprises blocks provided cyclically from each of the modulated data streams.

10. A method according to claim 8, wherein adding a predetermined separation sequence between the blocks comprises adding different separation sequences between different blocks.

11. A method according to claim 1, wherein multiplexing the modulated data streams comprises multiplexing the modulated data streams such that the resultant data stream includes at any specific time only signals from one of the streams.

12. A method according to claim 1, wherein modulating the data streams comprises modulating by modulators that operate independently from each other.

13. A method according to claim 12, wherein modulating the different data streams comprises modulating by modulators receiving a same timing signal.

14. A method according to claim 1, wherein modulating the data streams comprises modulating by a plurality of modulators that operate in accordance with a same modulation method.

15. A method according to claim 1, wherein modulating the data streams comprises modulating by a plurality of modulators including at least two modulators that operate according to different modulation methods.

16. A method according to claim 1, wherein modulating the data streams comprises modulating into a plurality of streams at a same power level.

17. A method according to claim 1, wherein modulating the data streams comprises modulating into a plurality of streams having different power levels.

18. A method according to claim 1, wherein modulating the data streams comprises modulating by a plurality of modulators that operate at different bit rates.

19. A method according to claim 1, comprising upconverting the modulated data streams before the multiplexing.

20. A method according to claim 1, comprising transmitting the single data stream on an analog carrier.

21. A method according to claim 1, wherein multiplexing the modulated data streams comprises multiplexing while the data streams are in a digital form.

22. A method according to claim 1, wherein multiplexing the modulated data streams comprises multiplexing while the data streams are in an analog form.

23. A method according to claim 1, wherein modulating the different data streams comprises modulating by modulators included in a single transmitter.

24. A method according to claim 1, wherein modulating the data streams comprises modulating using a QAM or PSK modulation.

25. A method according to claim 1, wherein modulating the data streams comprises modulating using a OFDM modulation.

26. A method according to claim 1, wherein modulating the data streams comprises modulating using a CPM modulation.

27. A modulator system, comprising:
a plurality of modulators;
a plurality of respective selectors for each of the modulators, adapted to alternately provide the modulators with a block from an input stream or a predetermined separation sequence; and
a multiplexer adapted to combine modulated data streams from the modulators into a single data stream which includes at any specific time only signals from one of the modulators, such that switches between two modulated data streams occur when respective filters of multiplexers of the two modulated data streams have a substantially same state.

28. A modulator system according to claim 27, wherein the plurality of modulators operate independently of each other.

29. A method of data modulation and transmission, comprising:
modulating a plurality of data streams, having different content, independently of each other;
switching between data streams when respective filters of multiplexers of the data streams have a substantially same state; and
upconverting the modulated data streams into a frequency band without frequency gaps within the band; and
transmitting the upconverted modulated data stream on a transmission medium.

30. A method according to claim 29, wherein transmitting the upconverted modulated data stream comprises transmitting on a wireless medium.

31. A method according to claim 29, comprising multiplexing the modulated data streams before the upconversion.

* * * * *